July 29, 1924.
G. L. MARTIN
WHEEL
Filed Oct. 22, 1920     2 Sheets-Sheet 1
1,503,057
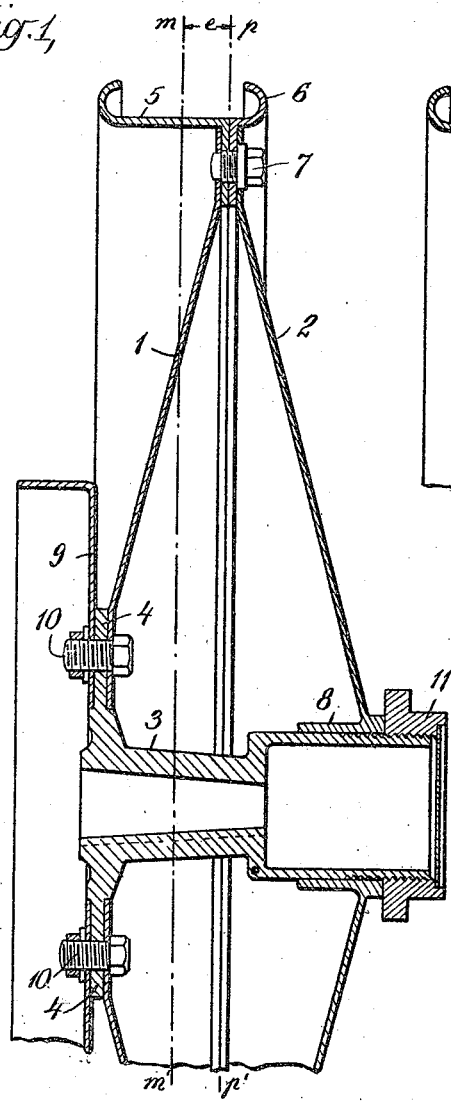
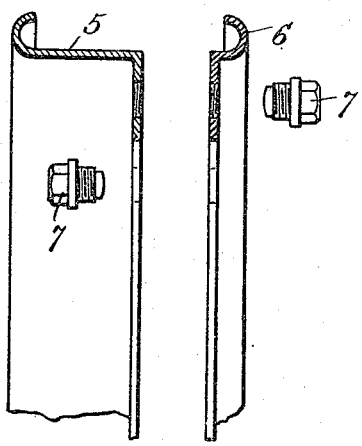
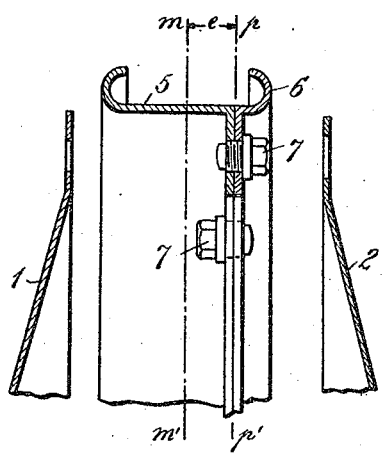
Guillermo Luis Martin,
Inventor
By his Attorneys
Pennie, Davis, Marvin & Edmonds July 29, 1924.
G. L. MARTIN
WHEEL
Filed Oct. 22, 1920     2 Sheets-Sheet 2
1,503,057
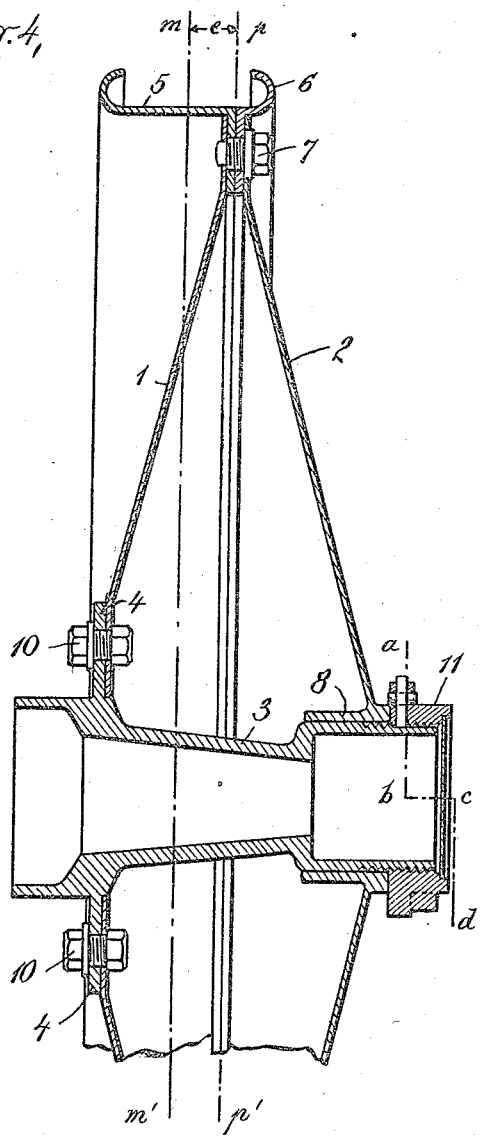
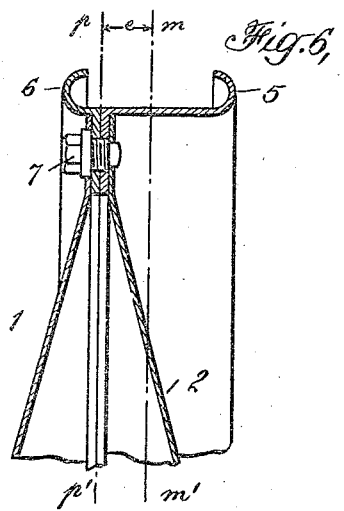
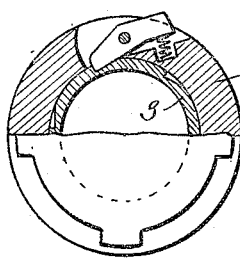
Guillermo Luis Martin,
Inventor,
By his Attorneys
Pennie, Davis, Marvin & Edmonds.

Patented July 29, 1924.

1,503,057

UNITED STATES PATENT OFFICE.

GUILLERMO LUIS MARTIN, OF LA PLATA, ARGENTINA.

WHEEL.

Application filed October 22, 1920. Serial No. 418,743.

*To all whom it may concern:*

Be it known that I, GUILLERMO LUIS MARTIN, residing at 436 54th Street, La Plata, Republic of Argentina, have invented certain new and useful Improvements in Wheels; and I do hereby declare the following to be a full, clear, and exact description of the invention, such as will enable others skilled in the art to which it appertains to make and use the same.

This invention relates to certain improvements in wheels for motor cars and similar vehicles and essentially has for its object an improved wheel construction consisting of detachable metallic discs or plates which offer considerable advantages over the wheels of known or usual construction.

In order that the invention may be readily understood and carried into practice without difficulties, a preferred form of construction of the same has been shown in the accompanying drawings, wherein:—

Figure 1 is a partial section of a wheel constructed according to this invention.

Figure 2 is a detail view of the detached tyre supporting rim.

Figure 3 is a detail view, showing the rim parts secured together and the wheel discs or plates detached from each other.

Figure 4 is a view similar to that of Figure 1, illustrating a modified construction.

Figure 5 illustrates the operation of the locking or safety-pin, and

Figure 6 is part of the rim of the wheel, showing the manner in which the track gauge may be increased.

In all the said views, similar signs of reference have been used to indicate like or corresponding parts.

The wheel constructed in accordance with this invention consists of a hub part 3 (Figures 1 and 4) formed on one of its sides with a plain flange 4, and on the other with a cylindrical, externally threaded end. To the flanged part 4 is secured a conical plate or disc 1, by means of a suitable number of bolts 10 which, in the case of the rear or drive wheel (Figure 1) also serve to secure in position the brake drum, 9.

The conical plate 2 is provided, like the plate 1, with a plain flange and is formed at its centre with the sleeve 8. The part 2 constitutes the detachable plate or disc of the wheel structure.

The rim, divided along the plane indicated by the line $p$—$p'$, is formed by two sections 5 and 6, connected together by a series of screw bolts 7, threaded into holes provided along the straight flanges of said sections. One half of the series of screws 7 are preferably placed with their heads at one side of the line $p$—$p'$, while the remainder is arranged with the heads looking in the opposite direction, as will clearly be seen by referring to Figure 3.

A nut 11, threaded on the cylindrical end or sleeve of the hub 3 and provided with the locking or safety device shown in Figure 5, which permits of said nut only to be detached by means of a special key, presses said disc or plate 2 against the plate 1, thus securing in position the tyre rim between both plates or discs.

Figure 5 clearly illustrates the operation of the locking pin or safety latch.

In order to place the tyres on the rims, it will be sufficient to loosen the nut 11 and the sleeve 8 of the detachable plate 2; thereupon the screws 7 are loosened and the part 6 of the rim is withdrawn when the tyre may be placed onto the rim part 5 and the parts may again be secured in position.

The rim is interchangeable and may directly be replaced, if desired, by an auxiliary rim, for which purpose it will be sufficient to withdraw the nut 11, remove the detachable plate or disc 2 and detach the rim with its tyre, which latter may then be replaced by the auxiliary rim, whereupon the aforementioned parts are again secured in position, as already explained.

Referring to the views shown in the accompanying drawings, it will be seen that the two halves of the rim of the wheel differ from each other; this arrangement permits of varying the track gauge of the wheels. When referring to Figure 4 it will be apparent that the track gauge is equal to the space existing between the central lines $m$, $m'$ of the tyres of the two wheels. If after withdrawal of the nut 11 the rim be taken off and its position be inverted by turning the same around one of its diameters and securing it again in position, it will be evident that the central line $m$, $m'$ will have been displaced by a distance double the amount $e$ which separates the lines $m$, $m'$ and $p$, $p'$, owing to the operation having been performed in connection with both wheels; hence, the increase of the gauge will be equal to $4 \times e$.

This is one of the essential advantages offered by the wheel constructed in accordance to this invention.

It will be evident that modifications of arrangement and details may be introduced into the invention without departing from the scope thereof, such as has clearly been set forth in the claims hereunto annexed.

Having now described my invention, I declare that what I claim and desire to secure by Letters Patent, is:

In a vehicle wheel having a hub, and a body portion fixed upon the hub, the combination of a rim, an inwardly extending annular flange on the rim situated to one side of the median plane of the rim, and means for removably clamping the rim flange to the peripheral face of the wheel body, the relation of the parts being such that the median plane of the rim can be shifted within the limits of the hub.

In testimony whereof I affix my signature.

GUILLERMO LUIS MARTIN.